[54] PROCESS FOR RECLAIMING YTTRIUM ORTHOVANADATE PHOSPHORS

[72] Inventors: Costas C. Lagos; Richard A. Fowler, both of Danvers; Martha J. B. Thomas, Winchester, all of Mass.

[73] Assignee: Sylvania Electric Products Inc.

[22] Filed: June 30, 1970

[21] Appl. No.: 51,372

[52] U.S. Cl. ..................................................252/301.4 R
[51] Int. Cl. ........................................................C09k 1/44
[58] Field of Search..........................252/39.4 R; 23/312 ME

[56] References Cited

UNITED STATES PATENTS 3,348,924  10/1967  Levine et al......................252/301.4 R
3,474,040  10/1969  Hedler et al.....................252/301.4 R

*Primary Examiner*—Robert D. Edmonds
*Attorney*—Norman J. O'Malley, James Theodosopoulos and Joseph C. Ryan

[57] ABSTRACT

Europium activated yttrium orthovanadate phosphors are reclaimed and treated to eliminate unwanted ionic species. The phosphor is heated in a reducing atmosphere to reduce the vanadate and then dissolved in a mineral acid to form a clear solution. After the solvent is volatilized, the phosphor is heated in an oxidizing atmosphere.

1 Claims, No Drawings

3,668,140

1

PROCESS FOR RECLAIMING YTTRIUM ORTHOVANADATE PHOSPHORS

BACKGROUND OF THE INVENTION

This invention relates to the reclamation and treatment of europium activated yttrium orthovanadate ($YVO_4$) phosphors so that unwanted ionic species can be eliminated and so that desired species can be added.

Yttrium vanadate is a widely used matrix of cathodoluminescent and photoluminescent phosphors. Upon excitation the material fluoresces red when a trivalent europium activator is incorporated therein. To use the phosphor in a lamp or cathode ray tube, it is mixed with a binder and then coated upon the appropriate substrate. Then, the binder is volatilized or burned off and the phosphor adheres to the substrate.

The phosphor which is treated according to this invention frequently comes from color cathode ray tubes, especially those adapted to color television applications. These tubes usually employ at least one electron gun and a related viewing panel having a cathodoluminescent screen responsive to electron impingement disposed upon a surface thereof. Such a screen generally includes a plurality of discrete phosphor patterns consisting of elements such as bars, strips or dots in groups of three, each element, in response to electron beam excitation, emitting light of one of the primary colors, red, green and blue.

A screen of this may be fabricated by a conventional photographic printing technique wherein a photosensitive material is utilized to bind the color-emitting phosphors to the viewing panel. In such a process, the viewing panel is first coated with a thin film of a photosensitive substance such as sensitive polyvinyl alcohol and the yttrium vanadate phosphor. One method of coating is to first deposit a film of the photosensitive substance on the panel and then dispose the phosphor powder thereupon as by the well-known dusting procedure. Another method is applying a suspension of phosphor in the photosensitive substance as in the conventional slurry technique. The coated panel is then exposed to ultraviolet light through an appropriately patterned aperture mask to cause the photosensitive substance to polymerize or harden and adhere to the surface of the panel in accordance with the patterned negative exposure, thus binding the respective phosphor particles therewith. Those portions of the screen which are not exposed to light are subsequently removed by dissolving the substance with a suitable solvent. This procedure is repeated for the deposition of the other color-emitting phosphors to form the pattern of the screen. A subsequent bakeout eliminates the volatile ingredients leaving the phosphor-patterned screen as a completed unit of the tube structure.

As can be appreciated, only a very small fraction of the total phosphor in the suspension is used on the screen. The rest is recycled and eventually is reclaimed. Similarly with the yttrium vanadate which is used in lamps, the coating suspension eventually will become hardened with impurities and dirt from the system and have to be reclaimed.

When reclaiming, it is usually most desirable to separate the matrix from the activator and various other dopants. In that way, the quantity of activators or dopants can be easily modified and the end use of the phosphor can be changed. For example, bismuth is a preferred dopant when the phosphor is to be used in a cathode ray tube, whereas terbium is a preferred dopant when the phosphor is to be used in a high pressure mercury lamp. To interchange a reclaimed phosphor from one device to another was previously very difficult because of the nature of the dopants and the difficulty of extracting them from the matrix.

DESCRIPTION OF THE PRIOR ART

The compound yttrium vanadate is extremely difficult to dissolve. The known techniques involve heating and agitating the yttrium vanadate in excess fuming sulfuric acid, followed by dilution with water. Fuming sulfuric acid, commonly called oleum, is a heavy yellow liquid containing concentrated sulfuric acid and up to 80% $SO_3$. Use of oleum is quite dangerous in that ingestion or inhalation may cause death or permanent injury after very short exposure to small quantities. Contact, such as might occur due to splattering, can cause severe burns. When left in an area where exposure to moisture can occur, the oleum can explode. If heated to decomposition, oleum emits highly toxic fumes of oxides of sulfur which react with water or steam to produce heat and highly corrosive fumes. In the presence of reducing agents, the acid reacts vigorously and can be harmful.

Manifestly, techniques involving oleum are not well suited for large scale digestion of yttrium vanadate. Moreover, the economics of the digestion are not satisfactory since an acid to phosphor ratio of about seventy to one by weight is required. Additionally, the digestion must be carried out in expensive vessels which are inert to fuming sulfuric acid and the exact point where water dilution is necessary and the quantity of water which is necessary is a matter of judgment on the part of the operator. When the yttrium vanadate is subsequently dried, care must be exercised to avoid sulfur contamination which can easily occur because of the large amounts of $SO_3$ present.

SUMMARY OF THE INVENTION

According to the present invention, we have discovered a technique for digesting the yttrium vanadate which is simple and safe to operate and which can be easily adapted to removal of unwanted ionic species and subsequent incorporation of desired ionic species.

According to the invention, the yttrium vanadate phosphor to be treated is heated to a high temperature, generally above 600° C and preferably in the range of 600° to 1,000° C, in a reducing atmosphere such as hydrogen or carbon monoxide until the $YVO_4$ is reduced to $YVO_3$. A loss of an oxygen atom occurs at temperatures above 600° C in the presence of a reducing atmosphere. The $YVO_3$ can then be easily dissolved in a mineral acid, such as nitric to form a clear solution.

The concentration of the acid is important only in that more concentrated acids merely dissolve the vanadate more quickly and vice versa. When in solution, analysis can be easily prepared to determine what ionic species are present. For example, the most widely used activator is europium; however, adjustments may have to be made in the quantities to attain maximum brightness. Also, bismuth has been added to the phosphor to enhance the brightness under cathode-ray excitation in quantities as disclosed in the Mikus U.S. Pat. No. 3,360,674. Bismuth, however, is not beneficial when the phosphor is used in devices which depend upon ultraviolet excitation and it should be removed. Terbium on the other hand, should be included in conventional quantities as disclosed in U.S. Pat. No. 3,480,819.

Thus, bismuth can be easily removed when the yttrium vanadate is in the solution, by sulfide precipitation for example. The solution can be tested to see if substantially all is removed, and then add the terbium which is beneficial. The solution can then be spray dried according to the process disclosed in the copending application of Dale et al., Ser. No. 606,159, filed Dec. 30, 1966 and assigned to the same assignee as the instant application, now abandoned.

DESCRIPTION OF THE PREFERRED EMBODIMENTS

A 75 gram sample of $YVO_4:Eu_{.05}, Bi_{.0005}$ was placed into a shallow crucible which in turn, was disposed in an electrically heated tube furnace. The temperature of the furnace was maintained at 1,000° C and the phosphor heated to that temperature for one hour. During the heating, a reducing atmosphere of 5% $H_2$ and the balance nitrogen was maintained in the tube. The phosphor initially was a white color but after heating in the reducing atmosphere, it had turned black indicating that it had been reduced to $YVO_3$. The reduced product, $YVO_3$, was easily dissolved in 750 gms of 40 percent nitric acid. The bismuth is removed by precipitation with $H_2S$ to quantitatively remove it from the solution.

In another embodiment of the invention, 8 gms of reclaimed phosphor, that is phosphor which has been previously coated onto a glass surface, were heated in a furnace, as described above, in a carbon monoxide atmosphere until the material was black. The black $YVO_3$ was then dissolved in 20 percent nitric acid and was suitable for analysis, whereby the concentrations of the various dopants could be determined. After appropriate adjustments to the activator and dopant concentration, the solution was spray dried to form a powder of known analysis. The powder was heated to a temperature of 1,050° C, under oxidizing conditions, to restore luminescence.

In another embodiment 250 gms of europium activated yttrium vanadate were heated in a reducing atmosphere until the phosphor turned into a black powder. The powder was dissolved in 835cc of 70 percent nitric acid and 1,680cc of water. To this solution 0.128 gm (equal to 400 ppm) of terbium oxide ($Tb_4O_7$) was dissolved in the solution which was then spray dried to form a powder. This powder was heated to a temperature of 1,050° C, under oxidizing conditions, to restore the luminescent material. These luminescent materials were coated on a high pressure mercury lamp envelope and at zero hours exhibited 59 lumens per watt with a red rendition of 13.64 percent. At 100 hours the lamp produced 55.2 lumens per watt with 12.4 percent red. A control lamp using virgin terbium containing europium activated yttrium vanadate exhibited 62.0 lumens per watt at zero hours with a 14.7 percent red rendition. At 100 hours, the control was 55.0 lumens per watt with a 12.8 percent red rendition. Hence, it is apparent that relcaimed phosphor can exhibit substantially the same luminosity characteristics as virgin material at 100 hours.

Through the use of the present process, phosphors which have been previously used, such as excess from the dusting techniques for making color television screens can be reclaimed. Low luminosity batches and off-color materials can be reworked, at substantial cost saving, and utilized in lamps as a color corrector.

It is apparent that modifications and changes can be made within the spirit and scope of the present invention, but it is our intention only to be limited by the scope of the appended claims.

As our invention, we claim:

1. A process for removing bismuth from yttrium orthovanadate phosphor containing europium and bismuth activators in the matrix, the steps which comprise; heating said yttrium orthovanadate phosphor in a reducing atmosphere to reduce $YVO_4$ of said phosphor to $YVO_3$; dissolving the $YVO_3$ and said activators in nitric acid to form a clear solution: precipitating the bismuth in said clear solution with $H_2S$; removing the precipitated bismuth from the solution; volatilizing nitric acid solvent of the solution and recovering $YVO_3$ and europium activator in powder form; and heating said recovered $YVO_3$ and europium activator in an oxidizing atmosphere to produce yttrium orthovanadate phosphor containing europium activator.

* * * * *